United States Patent
Waddell et al.

(10) Patent No.: US 12,206,223 B2
(45) Date of Patent: Jan. 21, 2025

(54) ISOLATED LOAD ELECTRICAL DISTRIBUTION ENCLOSURE

(71) Applicant: ABB Schweiz AG, Baden (CH)

(72) Inventors: Rebecca Ann Waddell, Cumming, GA (US); Gilbert Taylor Miller, Henrico, VA (US); Zachary Wade Smith, Richmond, VA (US); Thomas Anthony Kendzia, III, Rockville, VA (US); Frank Allen Cowan, Chester, VA (US)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 17/830,969

(22) Filed: Jun. 2, 2022

(65) Prior Publication Data

US 2023/0396042 A1 Dec. 7, 2023

(51) Int. Cl.
H02B 1/48 (2006.01)
H02B 1/20 (2006.01)
H02G 5/06 (2006.01)

(52) U.S. Cl.
CPC .............. *H02B 1/48* (2013.01); *H02B 1/205* (2013.01); *H02G 5/068* (2013.01)

(58) Field of Classification Search
CPC .......... H02B 1/205; H02B 1/48; H02G 5/068
See application file for complete search history.

(56) References Cited

U.S. PATENT DOCUMENTS

| | | | |
|---|---|---|---|
| 5,181,158 A | 1/1993 | Goe, Jr. et al. | |
| 6,018,455 A * | 1/2000 | Wilkie, II | H01H 71/08 174/16.3 |
| 6,072,159 A * | 6/2000 | Wilkie, II | H02B 1/32 219/403 |
| 7,782,596 B2 | 8/2010 | Ross | |
| 8,411,418 B2 * | 4/2013 | Kikukawa | H02B 13/0354 361/612 |
| 9,608,413 B2 | 3/2017 | Kubota et al. | |
| 2006/0120027 A1 | 6/2006 | Josten et al. | |
| 2010/0084188 A1* | 4/2010 | Rajvanshi | H02G 3/085 174/666 |
| 2010/0096962 A1* | 4/2010 | Rajvanshi | H02B 1/06 312/223.1 |
| 2017/0271853 A1 | 9/2017 | Nguyen et al. | |
| 2017/0310091 A1 | 10/2017 | Shimabukuro et al. | |
| 2018/0131162 A1 | 5/2018 | Dominguez et al. | |
| 2021/0242667 A1 | 8/2021 | Harr et al. | |

FOREIGN PATENT DOCUMENTS

| | | | |
|---|---|---|---|
| DE | 6907500 | 7/1969 | |
| DE | 4239826 A1 * | 6/1993 | ........... H01H 33/666 |
| DE | 202006006711 U1 | 7/2006 | |

* cited by examiner

Primary Examiner — Robert J Hoffberg
(74) Attorney, Agent, or Firm — McCarter & English, LLP

(57) ABSTRACT

An electrical distribution enclosure includes an electrically insulated panel defining an access portion of the enclosure and a load portion of the enclosure; at least one electrically insulated compartment panel positioned within the access portion; and two or more compartments within the access portion, each compartment separated from an adjacent compartment by an electrically insulated compartment panel, each of the two or more compartments having a front-accessible neutral connection, at least one front-accessible phase connection and a at least rear phase connection.

20 Claims, 9 Drawing Sheets

ISOLATED LOAD ELECTRICAL DISTRIBUTION ENCLOSURE

BACKGROUND

The field of the disclosure relates generally to electrical enclosures and, more particularly, to systems and methods for accessing load connections in an electrical enclosure.

Electrical distribution system circuits and components are housed in a cabinet. Locating the systems in a cabinet protects and shields the circuitry and components from exposure to the ambient environment, and associated conditions, such as rain, snow, dust etc. that negatively impact the system functionality and shorten the useful life of the electrical distribution circuits.

While in service, distribution systems need to be serviced. The energized circuits, components, etc. located in the cabinet are typically accessed through a movable panel or door located in the housing. Such service may include replacing components, repairing components or circuits or adding new capacity and adding the required circuits to the existing distribution system. Currently, in order to provide the required service to the system, the technician moves the panel or door to gain access to the interior of the to the cabinet. Accessing the circuitry of current distribution systems requires technicians to reach through and across energized components. Because the system components are energized, to prevent injury to the technician, power to the system must be shut down, and circuitry deenergized in order to prevent injury to the technician. Technicians may overlook shutting power to the system before beginning work on the system and as a result may suffer serious injury. Accordingly, there is a need to be able to safely service a distribution system without the need to deenergize the circuits and system.

BRIEF DESCRIPTION

In one aspect, electrical distribution enclosure is disclosed. The electrical distribution enclosure includes an electrically insulated panel defining an access portion of the enclosure and a load portion of the enclosure; at least one electrically insulated compartment panel positioned within the access portion; and two or more compartments within the access portion, each compartment separated from an adjacent compartment by an electrically insulated compartment panel, each of the two or more compartments having a front-accessible neutral connection, at least one front-accessible phase connection and a at least rear phase connection.

In another aspect, electrical distribution assembly is disclosed. The electrical distribution assembly includes a first enclosure comprising at least one electrical switch and a neutral connection, the electrical switch having at least one load connection. A second enclosure includes an electrically insulated panel defining an access portion of the enclosure and a load portion of the enclosure; and, at least one electrically insulated compartment panel positioned within the access portion; and two or more compartments within the access portion, each compartment separated from an adjacent compartment by an electrically insulated compartment panel, each of the two or more compartments having a front-accessible neutral connection, at least one front-accessible phase connection and a at least rear phase connection. At least one electrical switch of the first enclosure is connected to the rear phase connection of the second enclosure, and the neutral connection of the first enclosure is connected to the neutral connection of the second enclosure.

In another aspect, a method of connecting a downstream branch connection to an electrical switch. The method includes opening the electrical switch, the electrical switch positioned within a first enclosure, the electrical switch having at least one load connection, the first enclosure having a neutral connection; connecting one or more cables to a front-accessible neutral connection of a second enclosure, the second enclosure comprising an electrically insulated panel defining an access portion and a load portion, at least one electrically insulated compartment panel positioned within the access portion, the at least one electrically insulated compartment panel extending from the electrically insulated panel defining two or more compartments, the two or more compartments having the front-accessible neutral connection, at least one front-accessible phase connection and at least one rear phase connection; and, connecting one or more cables to at least one front-accessible phase connection, the at least one front-accessible phase connection coupled to the at least one rear phase connection, the at least one rear phase connection connected to the at least one load connection of the electrical switch.

BRIEF DESCRIPTION OF THE DRAWINGS

The reference symbols used in the drawings, and their meanings, are listed in summary form in the list of reference symbols. In principle, identical parts are provided with the same reference symbols in the figures.

DETAILED DESCRIPTION

Figure 1:
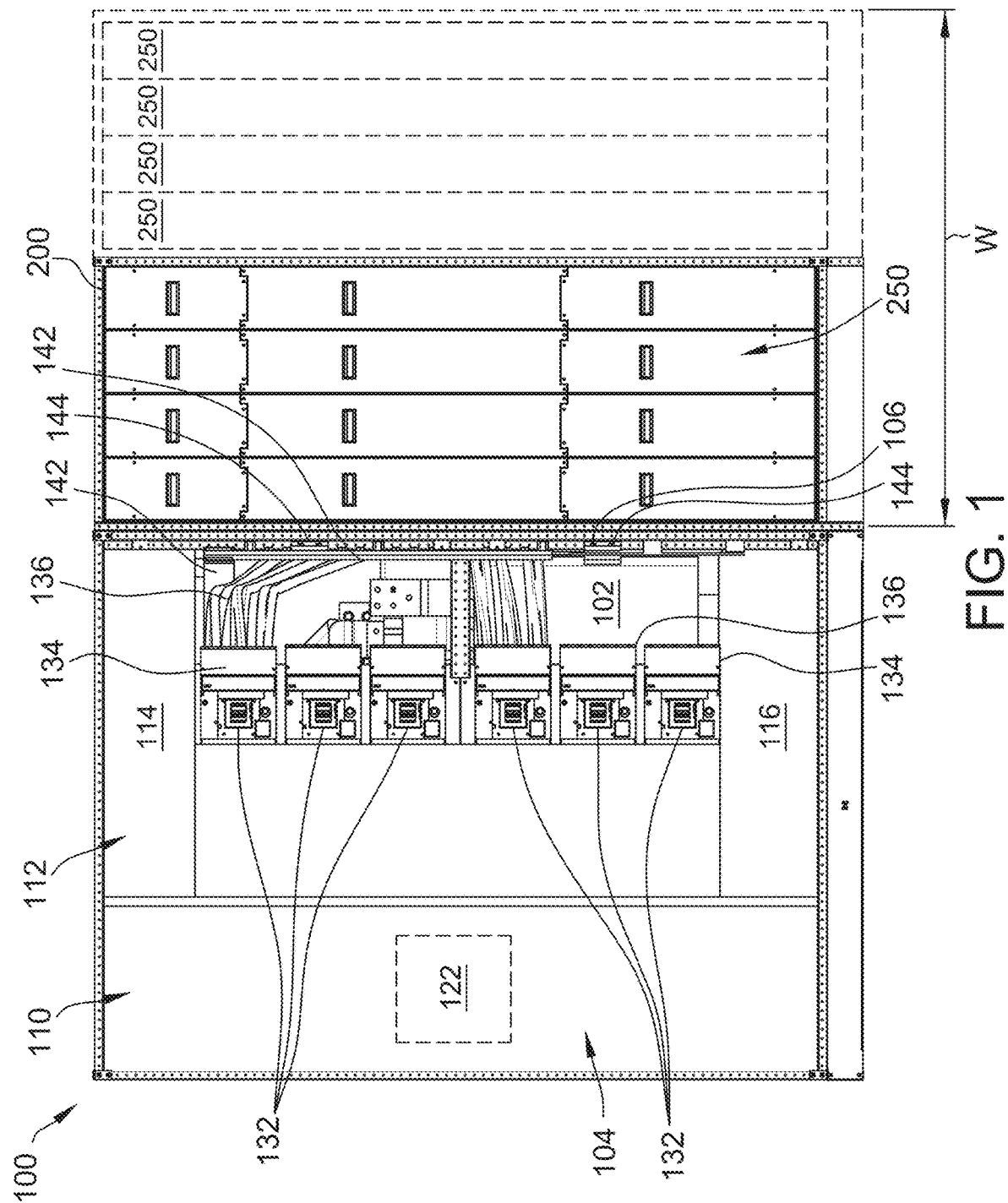
FIG. 1 is a schematic front view of a switchgear enclosure including an integral electrical distribution enclosure in accordance with embodiments of the present disclosure.

In the following specification and the claims, reference will be made to a number of terms, which shall be defined to have the following meanings.

As used herein, the singular forms "a," "an," and "the" include plural references unless the context clearly dictates otherwise. The terms "comprising," "including," and "having" are intended to be inclusive and mean that there may be additional elements other than the listed elements. The terms "optional" or "optionally" means that the subsequently described event or circumstance may or may not occur, and that the description includes instances where the event occurs and instances where it does not."

As used herein, the term "switchgear" refers to an electrical enclosure that houses electrical disconnect switches, (such as fused switches or circuit breakers). The switchgear includes a busbar assembly to carry electrical current from an external, main power source to downstream switches. The busbar assembly includes separate copper or aluminum laminations for each phase and additional laminations for a neutral to form an electrical circuit. Opening and closing of the phases is controlled by a main electrical disconnect switch (referred to herein as a "main") which has a line-side connection to the upstream external power source (such as a service entrance connection) and a load-side connection to downstream electrical disconnect switches (referred to herein as "branch switches") positioned within the switchgear enclosure. Branch switches downstream from the main can provide power to electrical equipment and components of an electrical system connected to the branch switches by way of cable conduit or busway extending from the switchgear enclosure. As used herein, the term "line-side connection" shall refer to an upstream connection of the element or component and "load-side connection" shall refer to a downstream connection of the element or component.

As used herein, the term "hot" refers to an electrical element, such as a switch, cable, busway or termination point of the present disclosure which has a voltage potential that deviates from ground. The term "cold" refers to an electrical element of the present disclosure that does not have a voltage potential. The term "closed" refers to an electrical circuit, a system, a component, feature, or element, such as a switch of the present disclosure in which electricity passes through and flows uninterrupted. The term "open" refers to a describes an electrical circuit, a system, a component, feature, or element, such as a switch of the present disclosure in which continuity is broken such that current is interrupted and does not flow. An open circuit is cold, and a closed circuit is hot.

Embodiments of the present disclosure are directed to an electrical distribution enclosure having compartmentalized and isolated power connection terminals. The electrical distribution enclosure can be integrated with a switchgear system, or the electrical distribution enclosure can be a standalone cabinet. An electrically insulated panel separates the enclosure into an access portion of the enclosure and a load portion, and the access portion is further separated by at least one electrically insulated compartment. Each electrically insulated compartment has a front-accessible neutral connection and a front-accessible phase connection such that a user can connect downstream components to the front connections of the compartment without being exposed to hot connections of adjacent compartments. Each electrically insulated compartment also has a phase connection extending into the load portion which is not accessible by the user when connecting downstream components to the front connections. During initial installation of the electrical distribution enclosure, the rear phase connection and the neutral of each compartment is connected to a corresponding branch switch. The branch switch can selectively be opened such that the front-accessible phase connection is cold, and the user can subsequently connect the front-accessible phase connection to downstream components without having to completely de-energize the switchgear.

Figure 2:
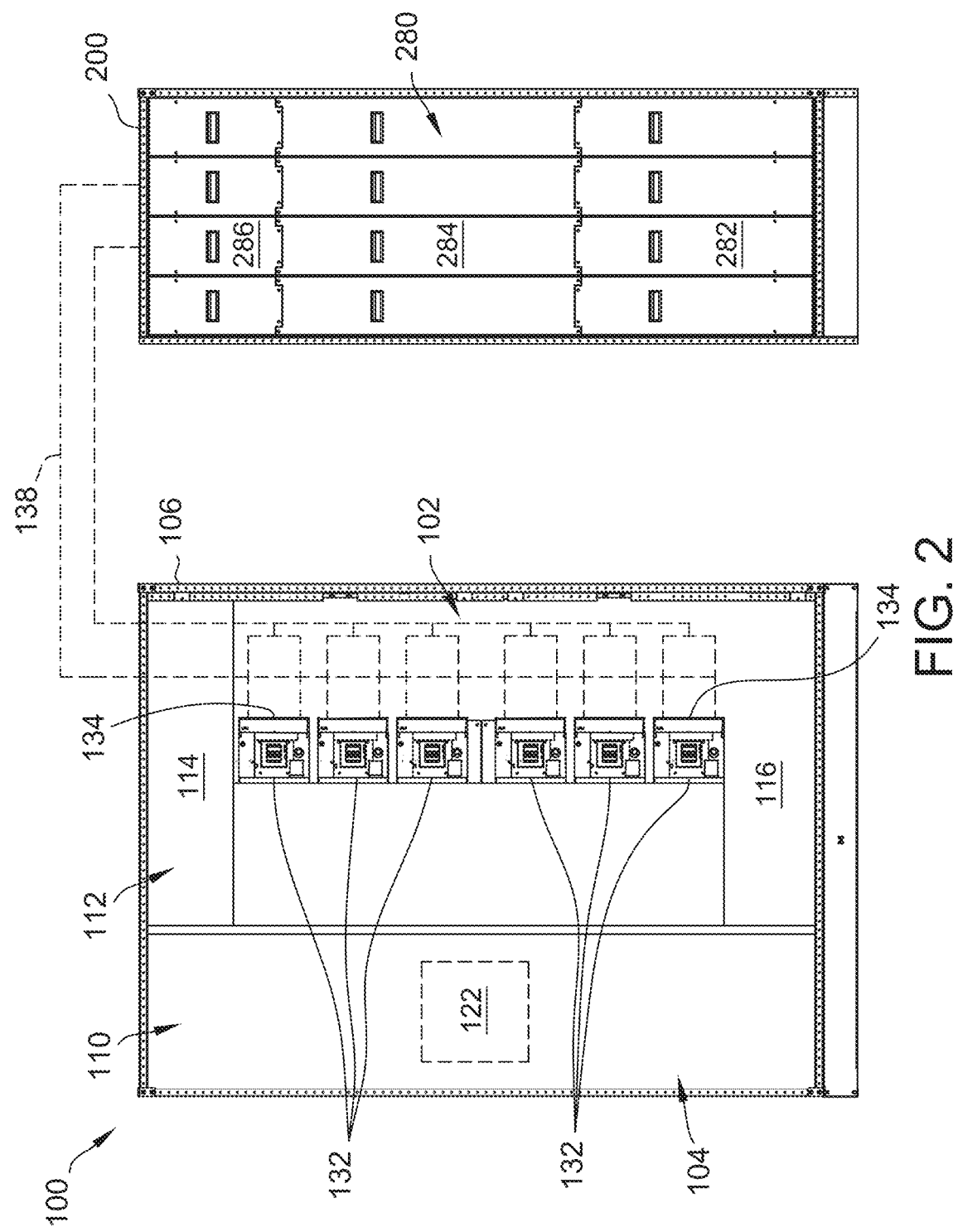
FIG. 2 is a schematic front view of a switchgear enclosure including an electrical distribution enclosure connected to the switchgear enclosure by a busway in accordance with embodiments of the present disclosure.

FIGS. 1 and 2 illustrate schematic front views of an exemplary switchgear enclosure 100. FIG. 1 illustrates an electrical distribution enclosure 200 integral to the switchgear enclosure 100, and FIG. 2 illustrates the electrical distribution enclosure 200 as a standalone cabinet or enclosure. The terms "cabinet" and "enclosure" shall be used interchangeably in the present disclosure. In the exemplary embodiment, switchgear enclosure 100 is a low-voltage switchgear 100. The term "low-voltage" refers to switchgear operating at voltages lower than 2 kV.

The switchgear enclosure 100 has a rectangular structure defining an interior space 102 within. The interior space 102 includes support structures for maintaining rigidity of the enclosure 100 and further support structures for positioning electrical switches (122, 132) within the interior space 102. The electrical switches (122, 132) are operable from a front 104 of the switchgear enclosure 100. However, in other embodiments, the switchgear 100 may have an alternative orientation, and is not intended to be limited to the orientation shown in FIG. 1. The electrical switches (122, 132) in the illustrated embodiments are three-phase power switches having three poles, however in other embodiments, the electrical switches (122, 132) can be single pole, double pole, or quad pole switches.

The electrical switches (122, 132) include a main switch 122 and a plurality of branch switches 132 electrically connected to the main switch 122 by a busbar assembly (not shown). In some embodiments, a dual feed power distribution unit (PDU) is electrically connected to the branch switches 132 such that two incoming sources of power are tied together. The PDU can transfer between the two incoming sources, or distribute both incoming sources to the branch switches 132. The main switch 122 has a line-side connection (not shown) which receives power from a utility power main or an upstream switch and a load-side connection (not shown) which branches out by the busbar assembly and electrically connects to all of the plurality of branch switches 132 located within the switchgear 100. Likewise, each of the plurality of branch switches 132 have a line-side connection (not shown) electrically connected to the main switch 122 and a load-side connection 134. Opening the main switch 122 will cut power to all of the plurality of branch switches 132, and opening and closing of the plurality of branch switches 132 will cut power to a downstream electrical system attributed to each of the plurality of branch switches 132. The load-side connection 134 of the each of the plurality of branch switches 132 can electrically connected to a corresponding downstream electrical system by power cables 136 (as shown in FIG. 1) or by a busway assembly 138 (as shown in FIG. 2).

In some embodiments, the main switch 122 is positioned within a main compartment 110 and at least some of the plurality of branch switches 132 are positioned within a sub-compartment 112 adjacent to the main compartment 110. Branch switches 132 of a larger power rating may not fit within a single sub-compartment 112, and thus, are separated into additional sub-compartments 112 positioned adjacent to one another. The busbar assembly can extend across adjacent sub-compartments through either an upper portion 114 or a lower portion 116 of the sub-compartment 112 to connect to the plurality of branch switches 132 of the adjacent sub-compartment 112. Additional sub-compartments can be positioned to the either side of the main compartment 110. As shown in FIGS. 1 and 2, the sub-compartment 112 is adjacent to the main compartment 110, however in other embodiments, switchgear 100 may have an alternative configuration, and is not intended to be limited to the orientation shown in FIGS. 1 and 2.

A neutral busbar 142 extends from the external power source across the switchgear enclosure 100 to a side edge 106 of the switchgear enclosure 100 for connection to adjacent cabinets. In the illustrated embodiment, the side edge 106 is a right-side edge 106, however in other embodiments, switchgear 100 may have an alternative orientation, and is not intended to be limited to the orientation shown in FIGS. 1 and 2. In some embodiments, opening and closing of the neutral busbar 142 is controlled by electrical switches (122, 132). In some embodiments, the neutral busbar 142 is independent from the electrical switches (122, 132) and extends to the side edge 106 of the switchgear enclosure 100 without any associated disconnect points or means. The neutral busbar 142 includes an L-shaped termination plate 144 at the side edge 106 of the switchgear enclosure 100 to connect to a corresponding neutral busbar of an adjacent cabinet or enclosure. By way of example, the termination plate 144 can connect to a corresponding termination plate 272 of a neutral busbar 270 of the electrical distribution enclosure 200 as shown in FIG. 4 In embodiments where the electrical distribution enclosure 200 is connected to the plurality of branch switches 132 by the busway assembly 138, a neutral bus can be included with the busway assembly 138 to transfer the neutral along with the phases to the electrical distribution enclosure 200.

The main switch 122, plurality of branch switches 132 and the busbar assembly connecting the switches are pre-assembled before shipment to a jobsite and the user can terminate the utility power main to the main switch 122. The user can also terminate the power cables 136 to the plurality of branch switches 132 prior to energizing the main switch 122. Under national and local electrical codes, these terminations must occur when the system is cold and the switchgear enclosure 100 is de-energized to prevent a user from coming into contact with a hot connection. To terminate the utility power to the main switch 122, a discrete switch feeding the main switch 122 must be opened. Likewise, to terminate a discrete system to the load-side connection 134 of any one of the plurality of branch switches 132, the user must open the main switch 122, thereby de-energizing all of the plurality of branch switches 132 and cutting power to the downstream electrical systems of all of the plurality of branch switches 132. Stated differently, connecting cables to a load-side connection 134 of a single branch switch 132 requires opening the main switch 122 because all termination points of the branch switches 132 are within the same interior space 102.

Figure 3:
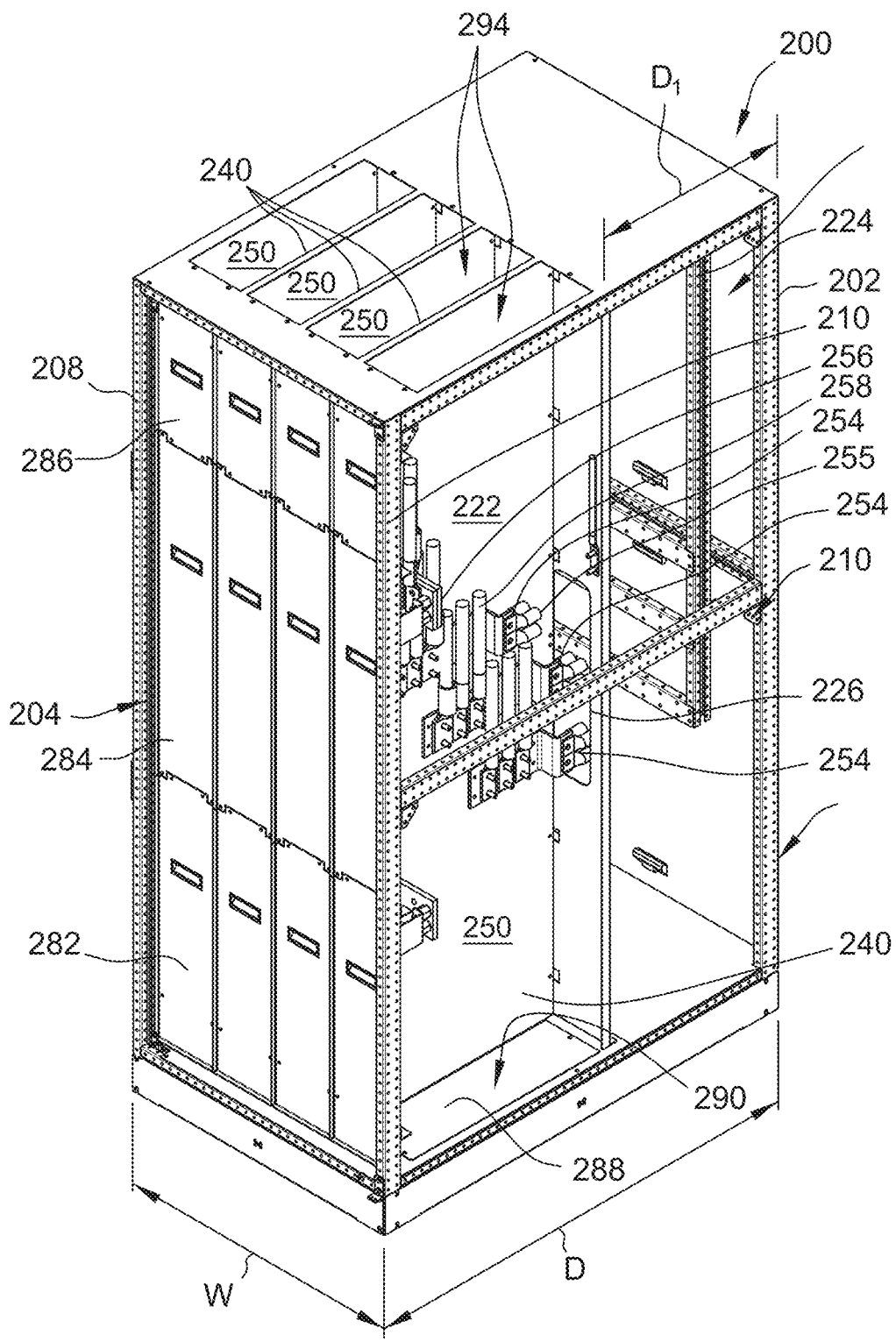
FIG. 3 is a perspective view of the electrical distribution enclosure of FIG. 1.
Figure 4:
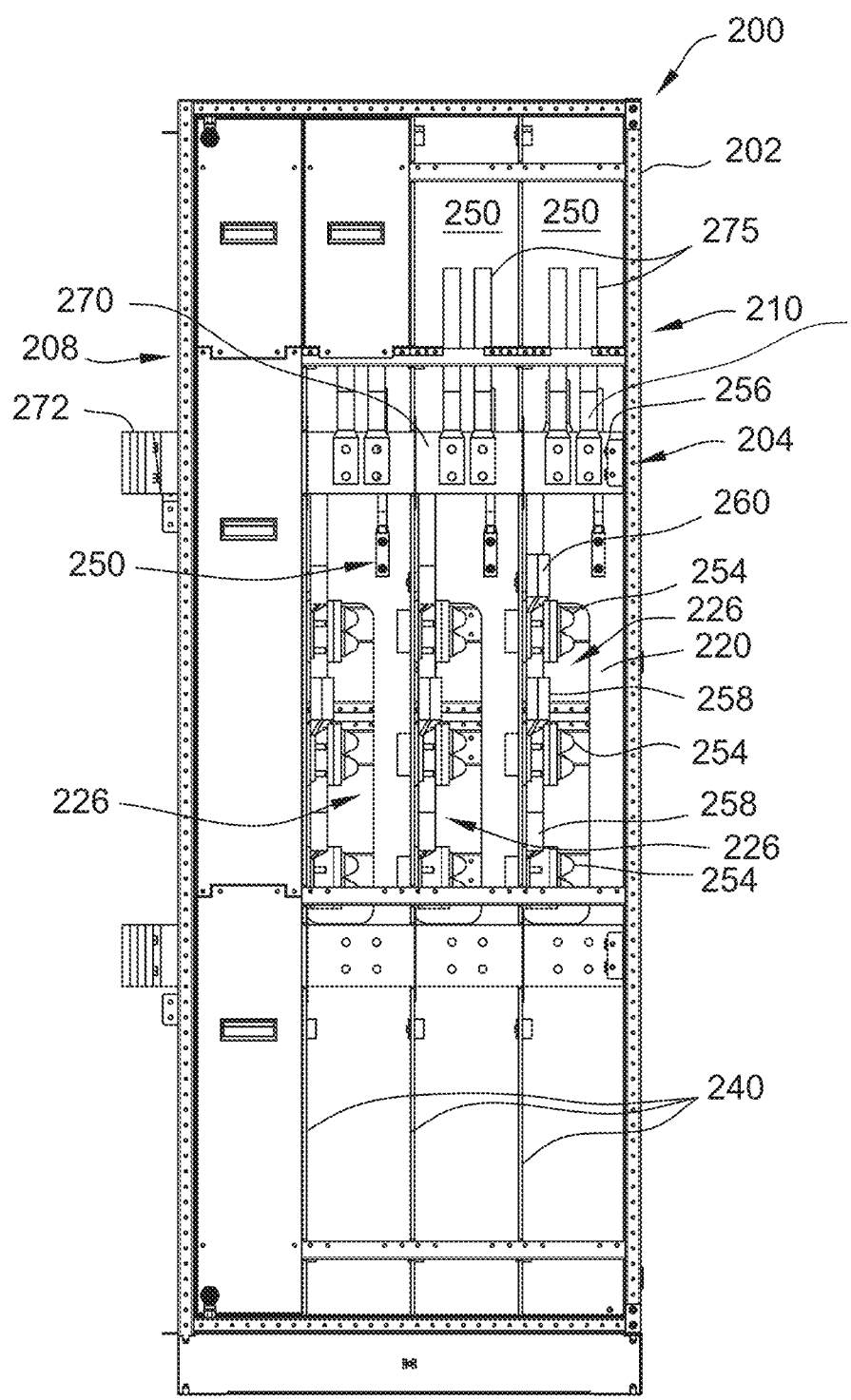
FIG. 4 is a front view of the electrical distribution enclosure of FIG. 1.
Figure 5:
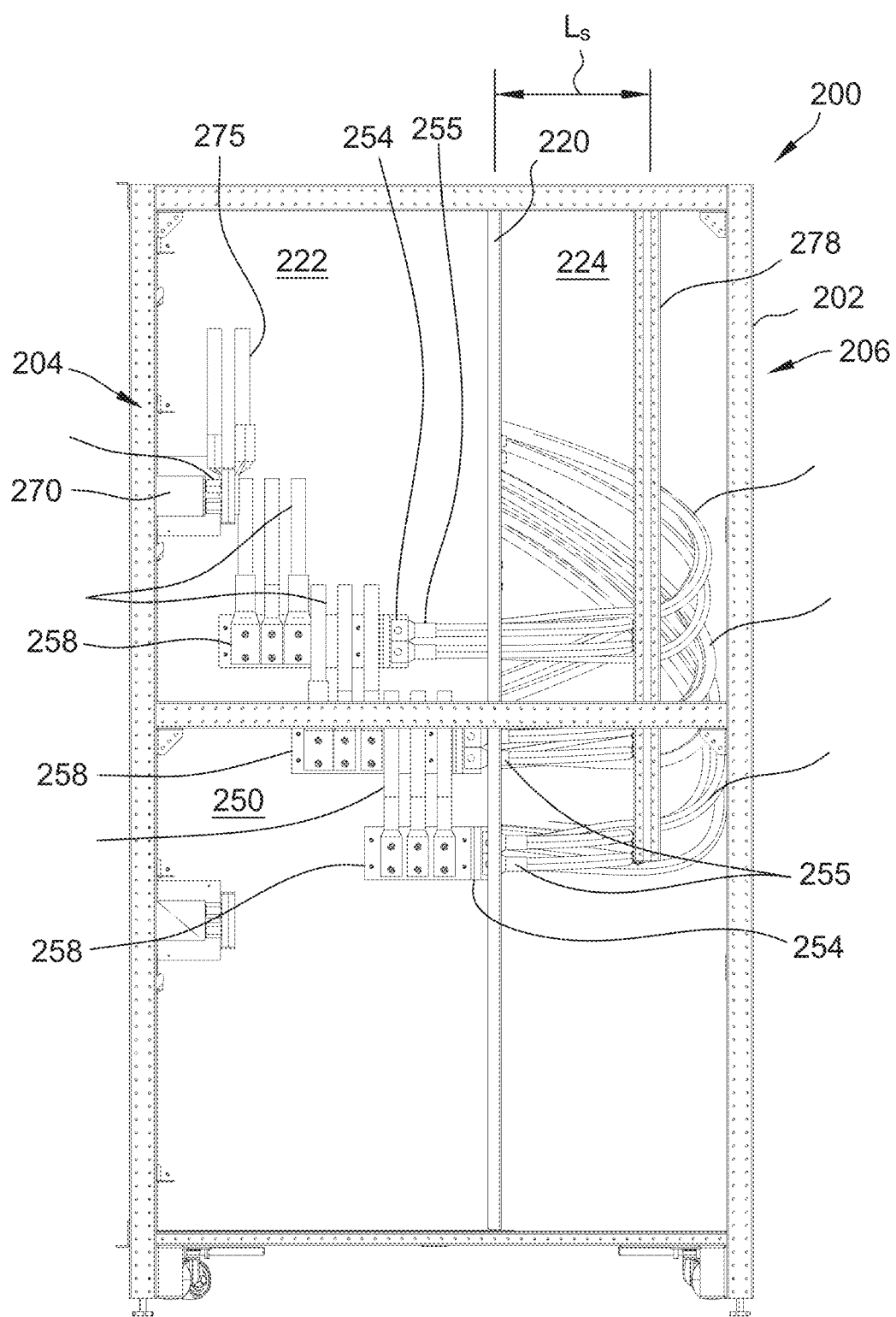
FIG. 5 is a first side view of the electrical distribution enclosure of FIG. 1.
Figure 6:
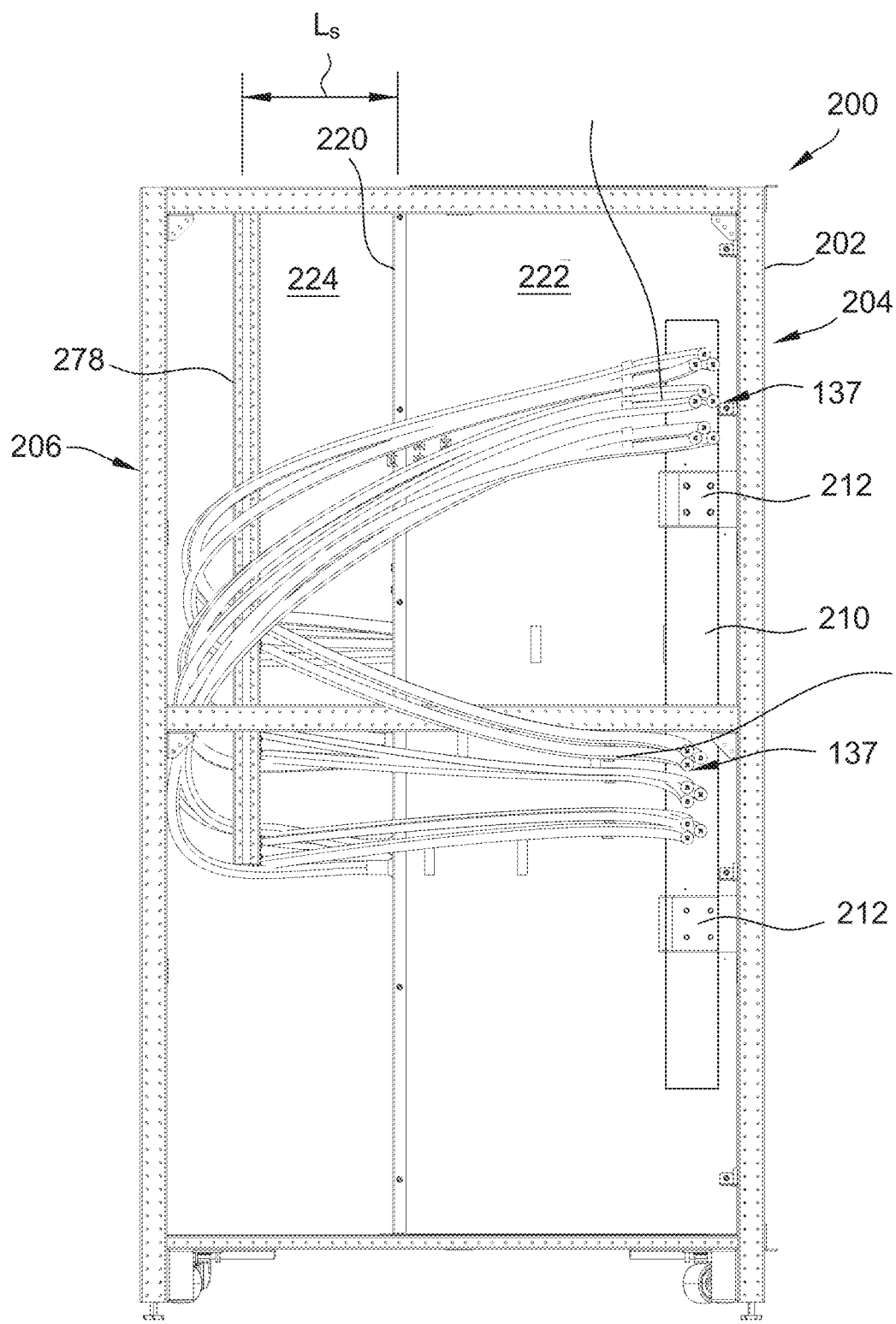
FIG. 6 is a second side view of the electrical distribution enclosure of FIG. 1.
Figure 7:
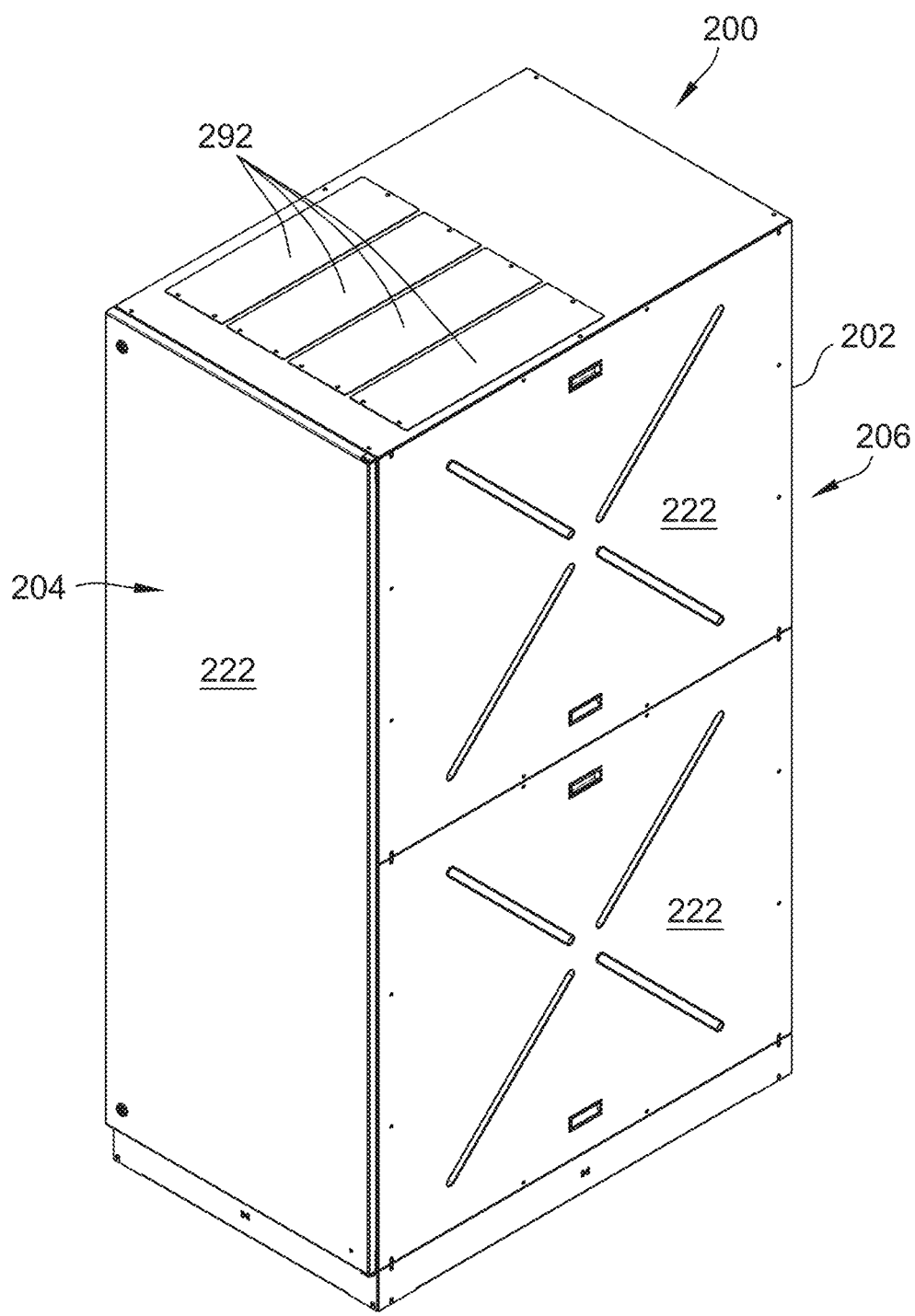
FIG. 7 is a perspective view of an electrical distribution enclosure in accordance with embodiments of the present disclosure.
Figure 8:
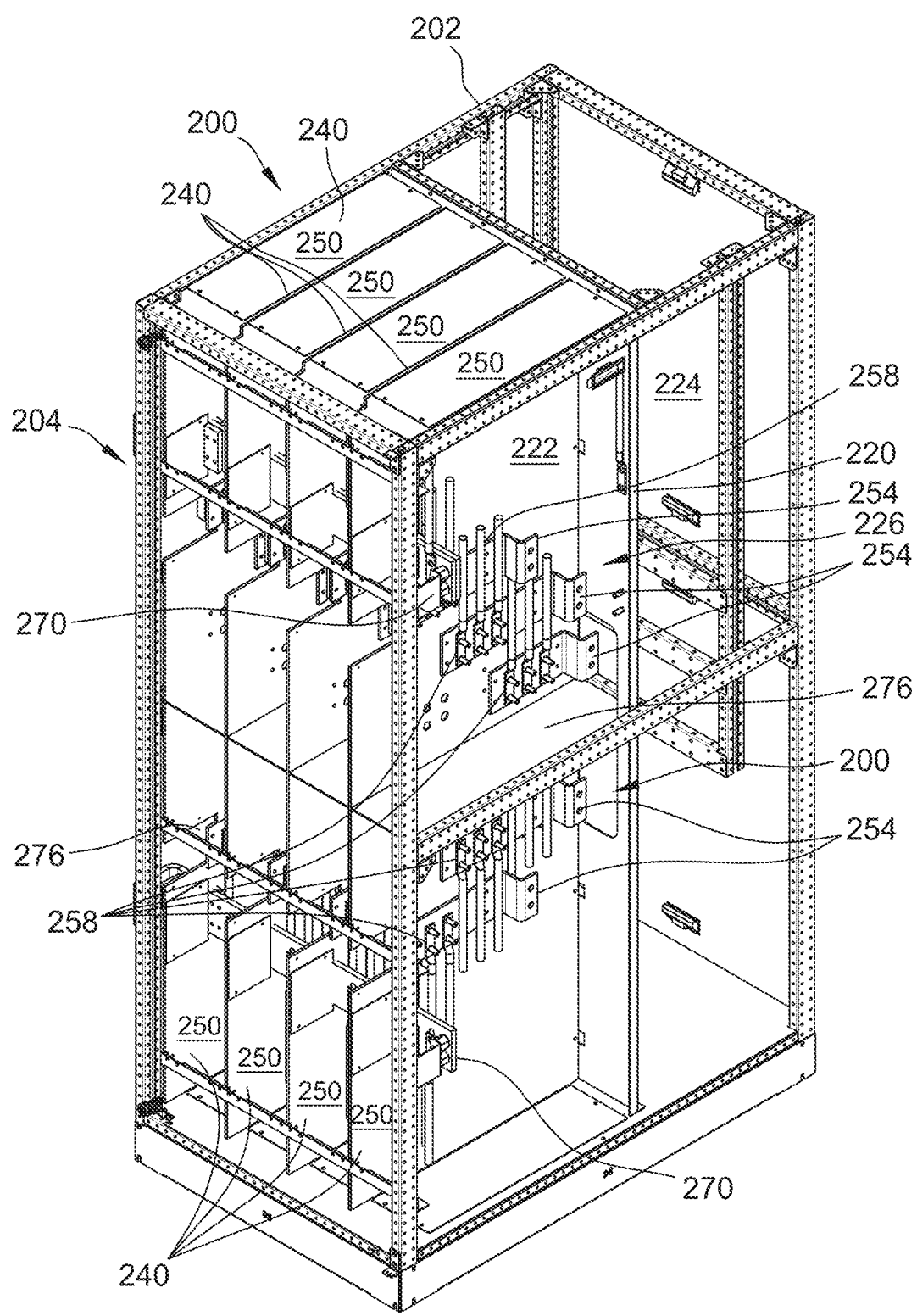
FIG. 8 is a perspective view of an electrical distribution enclosure in accordance with embodiments of the present disclosure; and, FIG. 9 is a side view of the electrical distribution enclosure of FIG. 1.

FIGS. 3-8 illustrate the electrical distribution enclosure 200 having compartmentalized and isolated power connection terminals such that a user can terminate downstream electrical components for a single branch switch without having to de-energize the entire switchgear 100. FIGS. 3, 7 and 8 illustrate perspective front views of the electrical distribution enclosure 200 showing the exterior of the electrical distribution enclosure 200, FIG. 4 illustrates a front view of the electrical distribution enclosure 200, FIG. 5 illustrates a side view of the second side 210 and FIG. 6 illustrates a side view of the first side 208.

As shown in FIG. 3, the electrical distribution enclosure 200 is defined by a rectangular frame 202 having a front 204 and a rear 206 defining a depth D, a first side 208 and a second side 210 defining a width W. The depth D is generally equal to a depth of the switchgear enclosure 100, and the first side 208 is positioned adjacent to the side edge 106 of the switchgear enclosure 100. As best shown in FIG. 1, the width W of the electrical distribution enclosure 200 can vary depending on the size, amperage, and number of plurality of branch switches 132 corresponding to the isolated power connection terminals as explained in further detail below.

The electrical distribution enclosure 200 includes an electrically insulated panel 220 extending from the first side 208 to the second side 210 separating the interior space of the electrical distribution enclosure 200 into an access portion 222 of the enclosure 200 and a load portion 224 of the enclosure 200. In the illustrated embodiment, the access portion 222 is positioned in the front 204 of the electrical distribution enclosure 200 and the load portion 224 is positioned at the rear 206 of the of the electrical distribution enclosure 200. However, in other embodiments, electrical distribution enclosure 200 may have an alternative orientation, and is not intended to be limited to the orientation shown in FIG. 3. Generally, where the electrical switches (122, 132) of the switchgear enclosure 100 are operable from the front 104, the access portion 222 of the electrical distribution enclosure 200 is also in the front 204 of the electrical distribution enclosure 200. The electrically insulated panel 220 is positioned a distance Di from the rear 206 of the frame 202. The access portion 222 is further separated by at least one electrically insulated compartment panel 240 extending from the electrically insulated panel 220 to the front 204 of the frame 202 and defining two or more compartments 250. As shown in FIGS. 3 and 4, in some embodiments, the electrical distribution enclosure 200 includes three electrically insulated compartment panels 240 defining four compartments 250. As shown in FIG. 1, the electrical distribution enclosure 200 can include any number of compartments 250. In some embodiments, the electrically insulated compartment panel 240 extends the entire height of the frame 202. In some embodiments, each compartment 250 includes an associated removable front panel 280 configured to provide access to the respective associated compartment 250. In some embodiments, the front 204 of each compartment 250 includes an associated removable lower panel 282, removable middle panel 284 and removable upper panel 286 configured to provide access to the compartment 250. Each compartment also includes a bottom access panel 288 covering a bottom access opening 290 and a top access panel 292 (as shown in FIG. 7) for covering a top access opening 294 for top-fed power cable configurations and bottom-fed power cable configurations respectively.

As shown in FIGS. 3 through 5, the electrically insulated panel 220 includes an opening 226 for each compartment 250. The opening 226 of each compartment 250 is positioned such that the rear phase connection 254 of each compartment 250 is accessible from the rear load portion 224 through the opening 226. For each phase, the compartment 250 includes a front-accessible phase connection 258 such that a user can terminate cables of a discrete system to front power connection terminals 260 by opening the removable front panel 280 (of FIG. 2) and feeding the power cables of the discrete system to the front-accessible phase connection 258. In some embodiments, the front-accessible phase connection 258 include lug termination points 259 configured to receive and secure individual power cables (not shown) of the discrete system.

A neutral busbar 270 extends across each of the two or more compartments 250 and is positioned in the front access portion 222 of the electrical distribution enclosure 200. For each compartment 250, a front-accessible neutral connection 256 is accessible from the front 204. Similar to the phase connections, the neutral busbar 270 includes neutral power connection terminals 274 for each compartment 250. In some embodiments, the neutral power connection terminals 274 include lug termination points 275 configured to receive and secure individual power cables (not shown) for the neutral of the discrete system. As best shown in FIG. 4, the neutral busbar 270 includes a termination plate 272 positioned at the first side 208 of the frame 202. When the switchgear enclosure 100 is adjacent to the electrical distribution enclosure 200, the neutral termination plate 144 of the switchgear enclosure 100 can be electrically connected to the neutral termination plate 272 of the electrical distribution enclosure 200. In some embodiments, the termination plate 144 of the switchgear enclosure 100 and the corresponding termination plate 272 of the electrical distribution enclosure 200 are L-shaped bus plates that can be bolted or otherwise fastened together. The front power connection terminals 260 and the neutral power connection terminals 274 for each compartment 250 are configured for top-fed cable entry. In some embodiments, one or more of the compartments 250 are configured for bottom-fed cable entry.

As best shown in FIGS. 5 and 6, power cables 136 from a branch switch 132 are terminated at the corresponding rear phase connection 254 of each compartment for each phase. The power cables 136 extend from each branch switch 132 of the plurality of branch switches 132 (illustrated in FIG. 5 as an upstream power cable end 137) and terminate at the rear phase connection 254 (as shown in FIG. 5). In the illustrated embodiments, each rear phase connection 254 includes lug termination points 255 for receiving the power cables 136. In embodiments where the electrical distribution enclosure 200 is adjacent and integral to the switchgear enclosure 100 (as shown in FIG. 1), the power cables 136 pass from the front 104 of the switchgear enclosure 100 to the rear 206 (and in particular the load portion 224) of the electrical distribution enclosure 200 to terminate at the lug termination points 255 for each rear phase connection 254. In embodiments where the electrical distribution enclosure 200 is positioned a distance from the switchgear enclosure 100, the power cables 136 can be top-fed or bottom fed-into the load portion 224 to connect to the lug termination points 255 for each rear phase connection 254. The power cables 136 can be enclosed within a cable conduit in accordance with national and local electrical codes. In some embodiments, the rear phase connection 254 can include bus plates (not shown) for terminating busbar from the branch switches 132.

As shown in FIG. 7, a removable dead front panel 222 covers the removable front panels 280 of FIG. 2, and removable side panels (282, 284, 286) of FIG. 2 cover the second side 210 of the frame 202 and top access panel 292 cover the top access opening 294 for each of the two or more compartments 250. In embodiments where the electrical distribution enclosure 200 is positioned a distance from the switchgear enclosure 100, side panels also cover the first side 208 of the frame 202. The side panels 214 can be bolted to the frame. In some embodiments, the side panels 214 include a tab and latch system whereby the user can pull a latch to remove an entire panel.

As shown in FIGS. 3 and 6, in some embodiments, a movable cable support member 278 is positioned within the load portion 224 of the electrical distribution enclosure 200. The cable support member 278 is affixed to the top of the frame 202 and extends at least to the openings 226 of the electrically insulated panel 220. In some embodiments, the cable support member 278 is positioned a distance Ls from the electrically insulated panel 220. The cable support member 278 is configured to support the power cables 136. The distance Ls can be selected depending on the gauge and bend radius of the power cables 136 and the cable support member 278.

Figure 9:
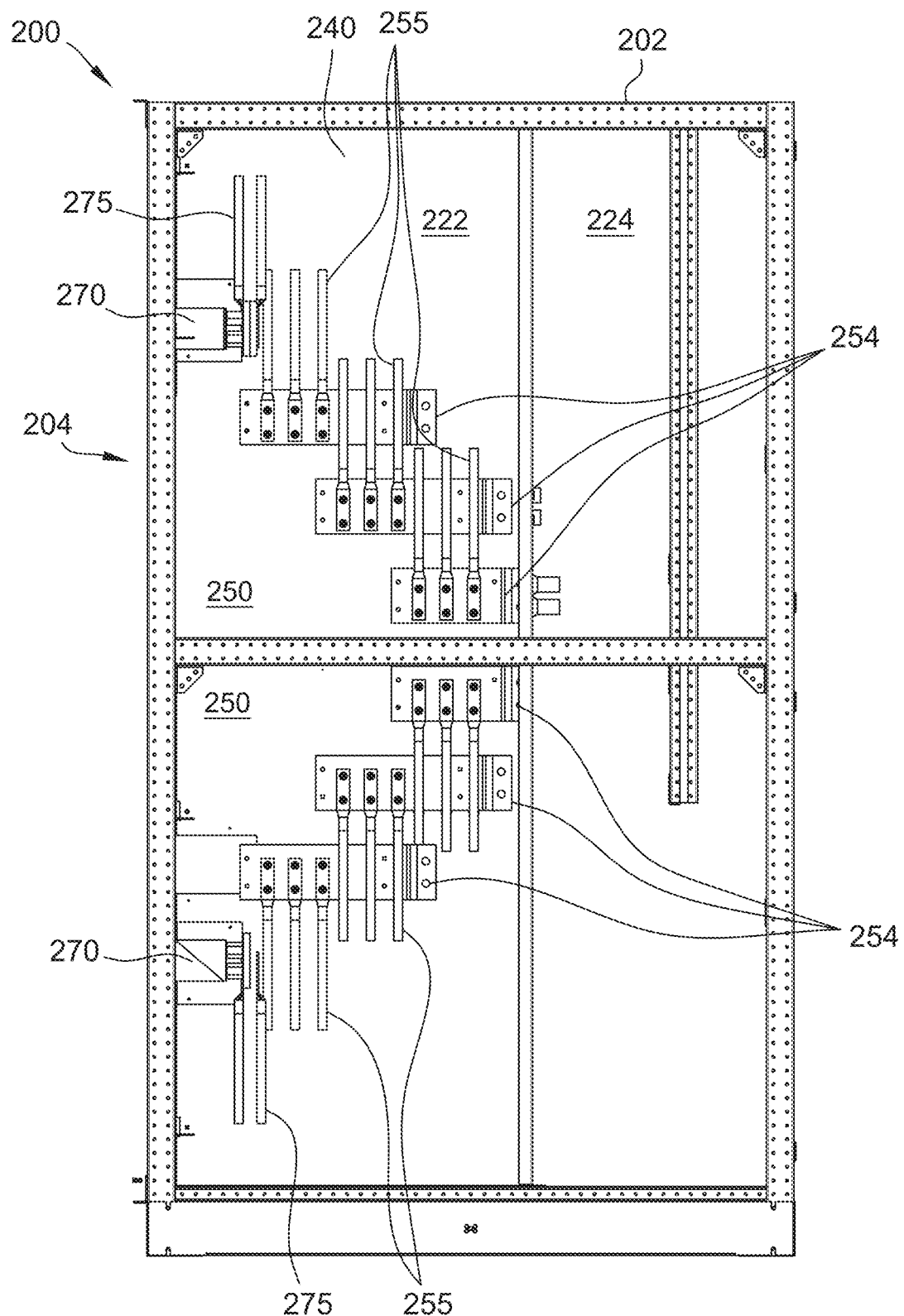

As shown in FIGS. 8 and 9, the electrical distribution enclosure 200 can include horizontal electrically insulated panel 276 separating the access portion 222 into a top portion and a bottom portion having compartments 250. The compartments 250 above the horizontal electrically insulated panel 276 include front-accessible phase connections 254 in a top-fed configuration and compartments 250 include front-accessible phase connections 258 in a bottom-fed configuration.

In operation, each branch switch of the plurality of branch switches 132 is electrically connected to a corresponding rear phase connection 254 of each compartment of the two or more compartments 250 for each phase of the branch switch 132. As shown in FIGS. 1, 5 and 6, the power cables 136 are electrically connected to the load-side connection 134 of the plurality of branch switches 132 and to the rear phase connections 254 of each of the two or more compartments 250. Connection of the power cables 136 can occur at the factory, or the cables can be connected at the jobsite by removing the side panels 222 (of FIG. 5) prior to energizing the switchgear enclosure 100 (i.e., prior to closing the main switch 122). To install a power cable of a discrete system into one of the two or more compartments s 250, the user opens the corresponding branch switch of the plurality of branch switches 132. Because each of the two or more compartments 250 is electrically isolated from adjacent compartments 250, the user opens one of the removable front panels 280. Auxiliary components such as such as controls, relays, communication devices, indicators, and the like can be installed onto the front-accessible phase connection 258 in the same manner.

Each compartment 250 can vary in size depending on the amperage rating of the corresponding branch switch 132. By way of example, a branch switch 132 of a higher amperage will require a wider compartment 250 due to heat generation of the components within. In general, in order for the compartment 250 to be considered properly heat rated for operation, the heat generated in each of the circuit components must not cause a temperature of the component to exceed a predetermined temperature rise limit, which may be governed or otherwise determined by regulatory standards.

Electrically insulating materials of the electrically insulated panel 220, at least one electrically insulated compartment panel 240 and the horizontal electrically insulated panel 276 can include, for example, an epoxy or fiberglass sheet. In some embodiments, the electrically insulated panel 220, at least one electrically insulated compartment panel 240 and the horizontal electrically insulated panel 276 are made of fiberglass reinforced thermoset polyester material (Glastic), Vulcanized paper (fishpaper), Nomex or Formex.

A method of connecting a downstream branch connection to an electrical branch switch is described. The method includes opening the electrical switch, the electrical switch positioned within a first enclosure, the electrical switch having at least one load connection, the first enclosure having a neutral connection; connecting one or more cables to a front-accessible neutral connection of a second enclosure, the second enclosure comprising an electrically insulated panel defining an access portion and a load portion, at least one electrically insulated compartment panel positioned within the access portion, the at least one electrically insulated compartment panel extending from the electrically insulated panel defining two or more compartments, the two or more compartments having the front-accessible neutral connection, at least one front-accessible phase connection and at least one rear phase connection; and, connecting one or more cables to at least one front-accessible phase connection, the at least one front-accessible phase connection coupled to the at least one rear phase connection, the at least one rear phase connection connected to the at least one load connection of the electrical switch.

Other variations to the disclosed embodiments can be understood and effected by those skilled in the art in practicing the claimed invention, from the study of the drawings, the disclosure, and the appended claims. In the claims the word "comprising" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electrical distribution enclosure comprising:
    an electrically insulated panel separating an access portion of the electrical distribution enclosure from a load portion of the electrical distribution enclosure;
    at least one electrically insulated compartment panel positioned within the access portion; and
    two or more compartments within the access portion, each of the two or more compartments separated from an adjacent one or ones of the compartments by at least one of the electrically insulated compartment panel, each of the two or more compartments having:
        a front-accessible neutral connection disposed at a front portion of each of the two or more compartments,
        at least one front-accessible phase connection disposed at the front portion of each of the two or more compartments, and
        at least one rear phase connection disposed at a rear portion of each of the two or more compartments, the at least one rear phase connection electrically coupled to a corresponding one of the at least one front-accessible phase connection.

2. The electrical distribution enclosure of claim 1, wherein the electrical distribution enclosure is configured as a three-phase system, the at least one front-accessible phase connection having three front-accessible phase connections and the at least one rear phase connection having three rear phase connections.

3. The electrical distribution enclosure of claim 1, wherein the front-accessible neutral connection comprises a bus bar extending across each of the two or more compartments.

4. The electrical distribution enclosure of claim 1, wherein the at least one electrically insulated compartment panel is three electrically insulated compartment panels, the two or more compartments is four compartments, the access portion comprises the three electrically insulated compartment panels defining the four compartments.

5. The electrical distribution enclosure of claim 1, wherein the at least one front-accessible phase connection includes at least one power connection terminal.

6. The electrical distribution enclosure of claim 1 further comprising a top panel having a removable cable feed panel positioned over each of the two or more compartments when the at least one front-accessible phase connection is arranged in a top-fed cable configuration.

7. The electrical distribution enclosure of claim 1, wherein each of the two or more compartments includes a removable front panel, the removable front panel configured to provide access to the front-accessible neutral connection and the at least one front-accessible phase connection of each of the two or more compartments.

8. The electrical distribution enclosure of claim 1, further comprising a second electrical distribution enclosure comprises two or more second compartments.

9. The electrical distribution enclosure of claim 1, wherein the at least one rear phase connection includes at least one lug terminal point.

10. The electrical distribution enclosure of claim 1, wherein the at least one rear phase connection of each of the two or more compartments is connected to a load side of a circuit switch of a second electrical distribution enclosure.

11. The electrical distribution enclosure of claim 10, wherein the at least one rear phase connection is connected to the circuit switch by a bus bar.

12. The electrical distribution enclosure of claim 10, wherein the at least one rear phase connection is connected to the circuit switch by at least one cable.

13. The electrical distribution enclosure of claim 12 further comprising a cable support member positioned within the load portion, the cable support member configured to support the at least one cable.

14. The electrical distribution enclosure of claim 13, wherein the cable support member is positioned a distance from the electrically insulated panel, wherein the cable support member is movable.

15. The electrical distribution enclosure of claim 13, wherein the at least one cable is connected to the at least one rear phase connection through an opening of each of the two or more compartments.

16. An electrical distribution assembly comprising:
a first enclosure comprising at least one electrical switch and a neutral connection, the electrical switch having at least one load connection; and,
a second enclosure comprising:
an electrically insulated panel separating an access portion of the second enclosure from a load portion of the second enclosure;
at least one electrically insulated compartment panel positioned within the access portion; and
two or more compartments within the access portion, each of the two or more compartments separated from an adjacent one or ones of the compartments by at least one of the electrically insulated compartment panel, each of the two or more compartments having:
a front-accessible neutral connection disposed at a front portion of each of the two or more compartments,
at least one front-accessible phase connection disposed at the front portion of each of the two or more compartments, and
at least rear phase connection disposed at a rear portion of each of the two or more compartments, the at least one rear phase connection electrically coupled to a corresponding one of the at least one front-accessible phase connection
wherein at least one electrical switch of the first enclosure is connected to the rear phase connection of the second enclosure, and the neutral connection of the first enclosure is connected to the front-accessible neutral connection of the second enclosure.

17. The assembly of claim 16, wherein opening the at least one electrical switch allows for service of the front-accessible neutral connection and the at least one front-accessible phase connection.

18. The assembly of claim 16, wherein the first enclosure is positioned adjacent to the second enclosure and the at least one load connection of the electrical switch is connected to the at least one rear phase connection by a cable or a busbar.

19. The assembly of claim 16, wherein the first enclosure is positioned a distance from the second enclosure and the at least one load connection of the at least one electrical switch is connected to the at least one rear phase connection by a cable conduit or a busway.

20. A method of connecting a downstream branch connection to an electrical switch comprising:
opening the electrical switch, the electrical switch positioned within a first enclosure, the electrical switch having at least one load connection, the first enclosure having a neutral connection;
providing a second enclosure comprising an electrically insulated panel separating an access portion of the second enclosure from a load portion of the second enclosure, at least one electrically insulated compartment panel positioned within the access portion, the at least one electrically insulated compartment panel extending from the electrically insulated panel, the at least one electrically insulated compartment panel separating two or more compartments, each of the two or more compartments having:
a front-accessible neutral connection disposed at a front portion of each of the two or more compartments,
at least one front-accessible phase connection disposed at the front portion of each of the two or more compartments, and
at least one rear phase connection disposed at a rear portion of each of the two or more compartments, the at least one rear phase connection electrically coupled to a corresponding one of the at least one front-accessible phase connection;
connecting one or more cables to the neutral connection of the first enclosure and at least one of the at least one front-accessible neutral connection of the second enclosure, and,
connecting the one or more cables to the at least one load connection of the electrical switch and at least one of the at least one rear phase connection.

* * * * *